(12) United States Patent
Tanaka et al.

(10) Patent No.: US 11,506,108 B2
(45) Date of Patent: Nov. 22, 2022

(54) VEHICLE

(71) Applicant: Mazda Motor Corporation, Hiroshima (JP)

(72) Inventors: Hiroshi Tanaka, Aki-gun (JP); Satoshi Ueno, Aki-gun (JP); Hiroshi Kinoshita, Aki-gun (JP); Kei Yonemori, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 8 days.

(21) Appl. No.: 17/342,798

(22) Filed: Jun. 9, 2021

(65) Prior Publication Data
US 2022/0003143 A1    Jan. 6, 2022

(30) Foreign Application Priority Data

Jul. 1, 2020 (JP) .............................. JP2020-113744

(51) Int. Cl.
| | |
|---|---|
| *F01P 3/20* | (2006.01) |
| *F01P 7/16* | (2006.01) |
| *B60K 6/46* | (2007.10) |
| *B60K 11/02* | (2006.01) |
| *F01P 7/14* | (2006.01) |

(52) U.S. Cl.
CPC ...... *F01P 3/20* (2013.01); *B60K 6/46* (2013.01); *B60K 11/02* (2013.01); *F01P 7/165* (2013.01); *F01P 2007/146* (2013.01); *F01P 2050/24* (2013.01)

(58) Field of Classification Search
CPC ........ F01P 3/20; F01P 7/165; F01P 2007/146; F01P 2050/24; B60K 6/46; B60K 11/02; B60K 6/42
See application file for complete search history.

(56) References Cited

U.S. PATENT DOCUMENTS

| | | | |
|---|---|---|---|
| 2007/0181356 A1* | 8/2007 | Ando ...................... | F01P 7/048 123/41.31 |
| 2018/0054094 A1* | 2/2018 | Dlala ....................... | H02K 1/14 |
| 2019/0077392 A1* | 3/2019 | Fujita ...................... | F28F 27/00 |
| 2019/0152343 A1* | 5/2019 | Onozawa .................. | F01P 7/14 |
| 2019/0359030 A1* | 11/2019 | Kim ......................... | B60H 1/08 |
| 2021/0016765 A1 | 1/2021 | Toda et al. | |

FOREIGN PATENT DOCUMENTS

JP          2019162964 A     9/2019

* cited by examiner

*Primary Examiner* — Jacob M Amick
(74) *Attorney, Agent, or Firm* — Alleman Hall Creasman & Tuttle LLP (57) ABSTRACT

In a cooling path of a motor, an oil control valve is provided between a motor cooling oil path and a first motor cooling path, a first heat exchanger is provided in the first motor cooling path, and a second heat exchanger is provided in a second motor cooling path. In a motor-drive mode, a valve control unit switches the oil control valve to the first motor cooling path side when an engine temperature is lower than a first threshold, and switches the oil control valve to the second motor cooling path side when the engine temperature is equal to or higher than the first threshold. In the first heat exchanger, motor cooling oil and engine oil exchange heat. In the second heat exchanger, the motor cooling oil and a coolant for the engine exchange heat.

20 Claims, 11 Drawing Sheets

VEHICLE

TECHNICAL FIELD

The present invention relates to a vehicle and, in particular, to a drive unit that has an engine and a motor.

BACKGROUND ART

In recent years, for purposes of reducing an environmental load and the like, hybrid vehicles including a motor in addition to an engine as drive sources of vehicle travel have been widespread.

In Patent Document 1, an automobile that includes an engine and a motor as drive sources of vehicle travel is disclosed. In the automobile disclosed in Patent Document 1, both of the engine and the motor, which are provided as the drive sources of the vehicle travel, are mounted in a front area.

The automobile disclosed in Patent Document 1 can be switched between an engine-drive mode in which the automobile travels by using the engine and a motor-drive mode in which the automobile travels by using the motor. When a driver selects the motor-drive mode, the automobile is driven by the motor.

Meanwhile, when the driver selects the engine-drive mode, the motor implements a torque assist function at a start of the automobile, and the automobile is driven by the engine at a specified vehicle speed or higher.

PRIOR ART DOCUMENTS

Patent Documents

Patent Document 1: JP2019-162964A

SUMMARY OF THE INVENTION

Problem to be Solved by the Invention

Further improvement in vehicle motion performance has been requested for the hybrid vehicle as described above. When attempting to improve the vehicle motion performance, it is beneficial to arrange the drive unit, which includes the engine and the motor, in an area near a center of the vehicle. By arranging the drive unit just as described, the vehicle can easily turn, and the vehicle motion performance can be improved.

However, since an occupant space is provided in the area near the center of the vehicle, a mounting space for the drive unit is limited therein. Thus, downsizing of the drive unit is required to arrange the drive unit in the area near the center of the vehicle for the purpose of improving the vehicle motion performance.

The present invention has been made to meet the demand as described above, and therefore has a purpose of providing a vehicle with vehicle motion performance of which can be improved by downsizing a drive unit having an engine and a motor.

Means for Solving the Problem

When the drive unit is driven for travel of the vehicle, the engine and the motor generate heat. Thus, cooling means for cooling the engine and the motor has to be provided for the drive unit. However, in the case where a cooling system for cooling the engine and a cooling system for cooling the motor are separately provided, an increase in size of the drive unit cannot be avoided due to provision of the cooling means.

In view of the above, as a measure for further improvement in the vehicle motion performance, the present inventors considered to share the cooling means as the cooling system for cooling the engine and as the cooling system for cooling the motor, so as to downsize the drive unit provided with the cooling means. More specifically, the present inventors considered that, compared to the case where the cooling systems were separately provided, the drive unit provided with the cooling means could be downsized by using a coolant circulation path and an engine oil circulation path provided in the engine cooling system as means for cooling the motor.

Here, when the vehicle is driven by the motor for the travel, engine drive power is low or zero. Thus, a temperature of the engine is relatively low. As a result, in the case where the motor cooling system is connected to the engine cooling system, the engine at the low temperature draws the heat from the motor. For this reason, the present inventors considered that motor cooling performance could be secured even without providing the motor cooling system in addition to the engine cooling system.

In the case where the drive unit provided with the cooling means can be downsized by sharing the cooling means as the engine cooling system and the motor cooling system, a mounting position of the drive unit in the vehicle can be set to the area near the center of the vehicle, and the vehicle motion performance can be improved.

However, when the present inventors investigated sharing of the cooling system as described above, the present inventors found a possible occurrence of a situation where, when the vehicle is kept driven by the motor, the heat of the motor was transferred to the engine via the engine cooling system and increased the temperature of the engine, then an amount of heat drawn from the motor to the engine was reduced, and consequently, the engine reached the temperature at which the motor could not be cooled sufficiently.

Thus, a vehicle according to one aspect of the present invention includes: a drive unit that has an engine and a motor arranged adjacent to each other and has, as drive modes, an engine-drive mode in which the vehicle travels by the engine and a motor-drive mode in which the vehicle travels by the motor; a first engine cooling path being a path of a first engine refrigerant for cooling the engine; a second engine cooling path being a path of a second engine refrigerant for cooling the engine, having a fan for cooling the second engine refrigerant in such a path, and being a different path from the first engine cooling path; a motor cooling path being a path of a motor refrigerant for cooling the motor and having a first motor cooling path and a second motor cooling path that are different paths from each other; a first heat exchanger by which the first engine refrigerant flowing through the first engine cooling path and the motor refrigerant flowing through the first motor cooling path exchange heat; a second heat exchanger by which the second engine refrigerant flowing through the second engine cooling path and the motor refrigerant flowing through the second motor cooling path exchange the heat; a first oil control valve that switches between the first motor cooling path and the second motor cooling path; an engine coolant temperature sensor for detecting a temperature of the engine; and a controller that controls the first oil control valve on the basis of the temperature of the engine. In the motor-drive mode, the controller executes switching control of the first oil control valve such that, in the case where the temperature of the engine is lower than a specified first threshold, the motor is cooled by the first motor cooling path, and in the case where the temperature of the engine is equal to or higher than the first threshold, the motor is cooled by the second motor cooling path.

Since the vehicle according to the above aspect includes: the first heat exchanger by which the first engine refrigerant and the motor refrigerant exchange heat; and the second heat exchanger by which the second engine refrigerant and the motor refrigerant exchange heat, heat generated during driving of the motor can be cooled by using the engine cooling path. In other words, in the vehicle according to the above aspect, motor cooling means and engine cooling means are shared. Accordingly, compared to a case where the cooling means is separately provided, it is possible to downsize the drive unit provided with the cooling means. Accordingly, for example, in the case where the drive unit is mounted in a front area of the vehicle, the drive unit can be mounted in a rear portion of the front area (a region near a center of the vehicle), and thus the center of gravity of the vehicle can be positioned at or near the center of the vehicle. In this way, in the vehicle according to the above aspect, vehicle motion performance can be improved.

In addition, in the vehicle according to the above aspect, in the motor-drive mode, in the case where the temperature of the engine is lower than the first threshold, the motor is cooled by using the first motor cooling path. That is, in the case where the temperature of the engine is lower than the first threshold, the heat generated by the motor is transferred to the first engine refrigerant in the first engine cooling path by the first heat exchanger, and the motor is thereby cooled. Thus, in the case where the temperature of the engine is lower than the first threshold, it is possible to suppress unnecessary driving of the fan in the second engine cooling path even when the fan receives the heat generated by the motor.

Furthermore, in the vehicle according to the above aspect, in the motor-drive mode (during travel of the vehicle by the motor), in the case where the temperature of the engine is equal to or higher than the first threshold, the motor is cooled by using the second motor cooling path. That is, in the case where the temperature of the engine is equal to or higher than the first threshold, the heat generated by the motor is transferred to the second engine refrigerant in the second engine cooling path having the fan by the second heat exchanger, and the motor is thereby cooled. Thus, in the case where the temperature of the engine is equal to or higher than the first threshold, the temperature of the motor can be maintained at an appropriate temperature by using the second engine cooling path having the fan.

The vehicle according to the above aspect further includes: an ebullient cooler having: a path for circulating an ebullient cooling refrigerant, a boiling point of which is lower than that of the motor refrigerant; an ebullient section that is disposed in the middle of the circulation path to exchange the heat between the motor refrigerant and the ebullient cooling refrigerant; and a condensation section that condenses the ebullient cooling refrigerant. In the case where the temperature of the engine is equal to or higher than the first threshold, the ebullient cooling refrigerant may be boiled in the ebullient section, the boiled ebullient cooling refrigerant may be condensed in the condensation section, and the motor may thereby be cooled.

In the case where the above configuration is adopted, the heat generated by the motor is also cooled by the ebullient cooler when the temperature of the engine is equal to or higher than the first threshold. Thus, even in the case where the motor is driven to generate a high output or is continuously driven for a long time, the motor can be maintained at the appropriate temperature.

In the vehicle according to the above aspect, the motor may have a pan for receiving the motor refrigerant in a lower portion thereof, and the ebullient section of the ebullient cooler may be disposed in the pan.

The adoption of the above configuration is beneficial to maintain the motor at the appropriate temperature by disposing a boiler of the ebullient cooler in the pan even in the case where the temperature of the engine is equal to or higher than the first threshold.

In the vehicle according to the above aspect, the ebullient cooler may further include an ebullient cooler fan that is arranged adjacent to the condensation section and cools the condensation section with air. In the case where the temperature of the engine is equal to or higher than the first threshold, the controller may drive the ebullient cooler fan.

In the case where the above configuration is adopted, even when the temperature of the engine is equal to or higher than the first threshold, the ebullient cooling refrigerant is effectively cooled by driving the ebullient cooler fan. Thus, this is further beneficial to maintain the motor at the appropriate temperature.

In the vehicle according to the above aspect, the motor cooling path may further have a third motor cooling path that is a path branched from an upstream side in a flow direction of the refrigerant from the first switching means and connected to the motor without the first heat exchanger and the second heat exchanger being interposed therebetween, a second oil control valve may further be provided at a position where the third motor cooling path is branched, and switches between the path to the first oil control valve and the third motor cooling path, and in the motor-drive mode, in the case where the temperature of the engine is equal to or higher than a second threshold that is higher than the first threshold, the controller may control the second oil control valve for cooling the motor by the third motor cooling path.

In the case where the above configuration is adopted, when the temperature of the engine is increased to the second threshold, the motor is cooled by the third motor cooling path without the first heat exchanger and the second heat exchanger being interposed. Thus, it is possible to suppress the temperature of the engine from being increased to the temperature that is higher than the second threshold. That is, in the case where the temperature of the engine is equal to or higher than the second threshold, the temperature of the motor can be maintained at the appropriate temperature by using the ebullient cooler to cool the motor.

In the vehicle according to the above aspect, the motor may have a rotor-and-stator and a housing that covers an outer side of the rotor-and-stator, and the motor refrigerant may be oil and flow from an upper side to a lower side inside of the housing.

When the above configuration is adopted, the oil (the motor refrigerant) flows through the housing of the motor, and the rotor-and-stator accommodated in the housing can thereby directly be cooled by the oil. This is beneficial to maintain the motor at the appropriate temperature during the travel of the vehicle in the motor-drive mode.

In the vehicle according to the above aspect, the first engine refrigerant may be engine oil, and the second engine refrigerant may be a coolant.

In the case where the above configuration is adopted and the temperature of the engine is lower than the first threshold, a temperature of the engine oil can be increased by the heat generated in the motor. In the case where the temperature of the engine is equal to or higher than the first threshold, the temperature of the coolant can be increased by the heat generated in the motor. In this way, while the vehicle travels in the motor-drive mode, the temperature of the engine can be increased. As a result, it is possible to improve engine efficiency at the time when the drive mode is switched to the engine-drive mode.

Advantage of the Invention

It is possible to improve the vehicle motion performance of the vehicle according to each of the above aspects by downsizing the drive unit having the engine and the motor.

MODES FOR CARRYING OUT THE INVENTION

A description will hereinafter be made on an embodiment of the present invention with reference to the drawings. The embodiment, which will be described below, merely constitutes an example of the present invention, and the present invention is not limited to the following embodiment in any respect except for an essential configuration thereof.

In the drawings used in the following description, "F," "R," "U," and "L" respectively indicate a front side of the vehicle, a rear side of the vehicle, an upper side of the vehicle, and a lower side of the vehicle.

Embodiment

1. Schematic Configuration of Vehicle 1

A description will be made on a schematic configuration of a vehicle 1 according to this embodiment with reference to FIG. 1.

Figure 1:
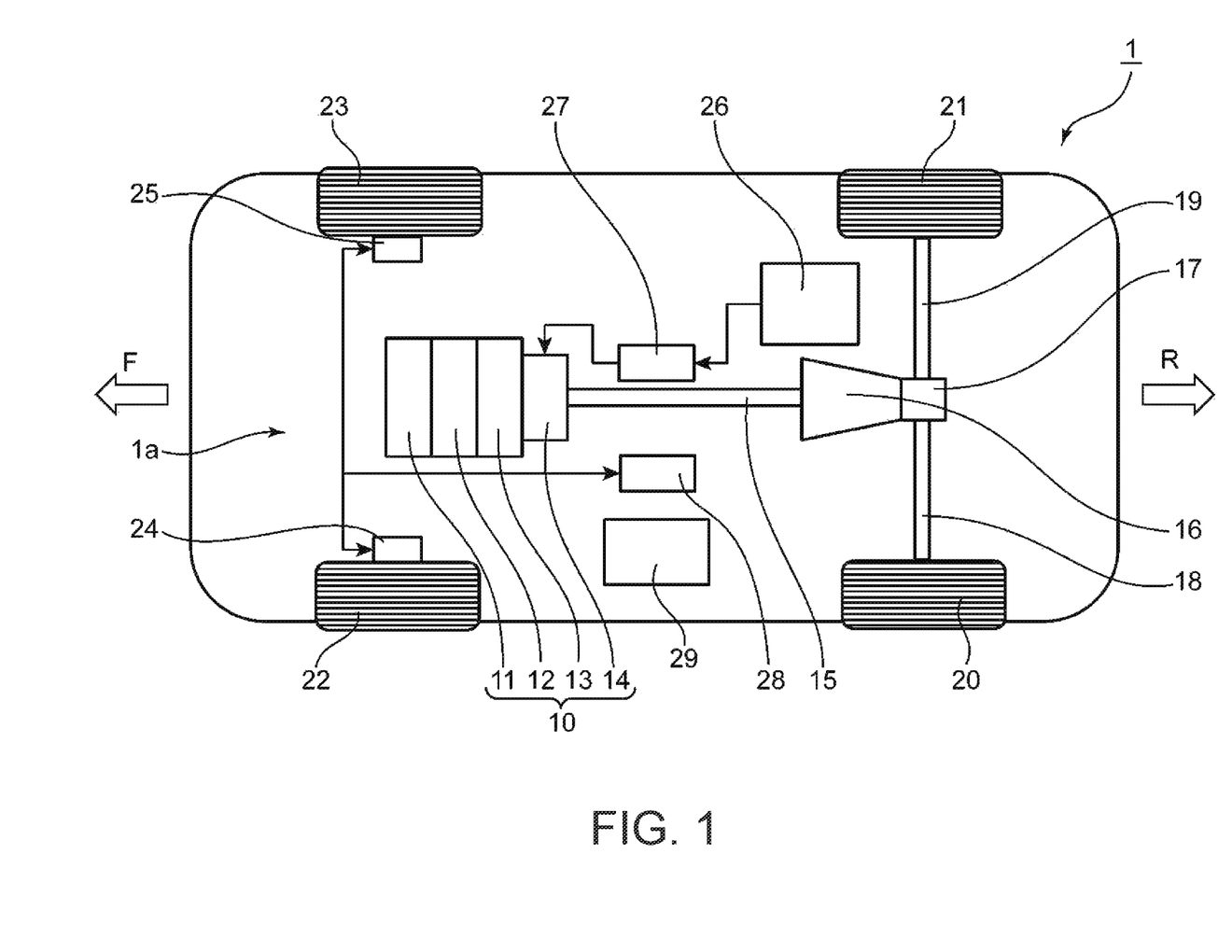
FIG. 1 is a schematic view illustrating an outline configuration of a vehicle according to an embodiment.

As illustrated in FIG. 1, in the vehicle 1, a drive unit 10 for driving the vehicle 1 is mounted to a rear portion in a front area 1a. The drive unit 10 includes engines 11 to 13 and a motor 14. A detailed structure of the drive unit 10 will be described below.

A propeller shaft 15 is connected to the drive unit 10. The propeller shaft 15 extends rearward at a center in a vehicle width direction of the vehicle 1. A rear end of the propeller shaft 15 is connected to a transmission 16.

A differential gear 17 is connected to the transmission 16. Driveshafts 18, 19 are respectively coupled to right and left portions of the differential gear 17 in the vehicle width direction. The driveshafts 18, 19 are connected to rear wheels 20, 21, respectively. That is, in the vehicle 1 according to this embodiment, the rear wheels 20, 21 are driven by drive power that is generated by the drive unit 10 mounted in the front area 1a.

In the vehicle 1, motors 24, 25 are respectively connected to front wheels 22, 23. Although not illustrated in detail, the motors 24, 25 are so-called in-wheel motors. The motors 24, 25 function as assist motors that generate power at a start of the vehicle 1 and transmit the power to the front wheels 22, 23, respectively. The motors 24, 25 also function as regenerative brakes, each of which generates electricity during deceleration of the vehicle 1. During the deceleration of the vehicle 1, the electricity generated by the motors 24, 25 is stored in a capacitor 28 and the like.

A battery 26 and an inverter 27 are also mounted to the vehicle 1. The battery 26 is an electricity storage module for supplying the electricity to the motor 14 of the drive unit 10. The battery 26 according to this embodiment is a lithium-ion battery, for example. The electricity from the battery 26 is supplied to the motor 14 via the inverter 27.

Here, the vehicle 1 according to this embodiment includes, as drive modes of the drive unit 10, an engine-drive mode and a motor-drive mode. The engine-drive mode is a mode in which the rear wheels 20, 21 are driven by the drive power output from the engines 11 to 13 and the vehicle 1 thereby travels. The motor-drive mode is a mode in which the rear wheels 20, 21 are driven by the drive power output from the motor 14 and the vehicle 1 thereby travels.

The vehicle 1 is configured that the motor 14 does not generate the drive power at the time of driving in the engine-drive mode and the engines 11 to 13 do not generate the drive power at the time of driving in the motor-drive mode.

In the vehicle 1, a drive mode control unit 29 executes switching control between the engine-drive mode and the motor-drive mode. The drive mode control unit 29 is configured to include a microcomputer that has a processor (i.e., a central processing unit (CPU)), memory (i.e., ROM and/or RAM), and the like. The drive mode control unit 29 executes the drive mode control on the basis of an instruction from a driver, a situation of the vehicle 1 (a vehicle speed, acceleration/deceleration, a battery remaining amount), and the like.

2. Mounting Position of Drive Unit 10

Figure 2:
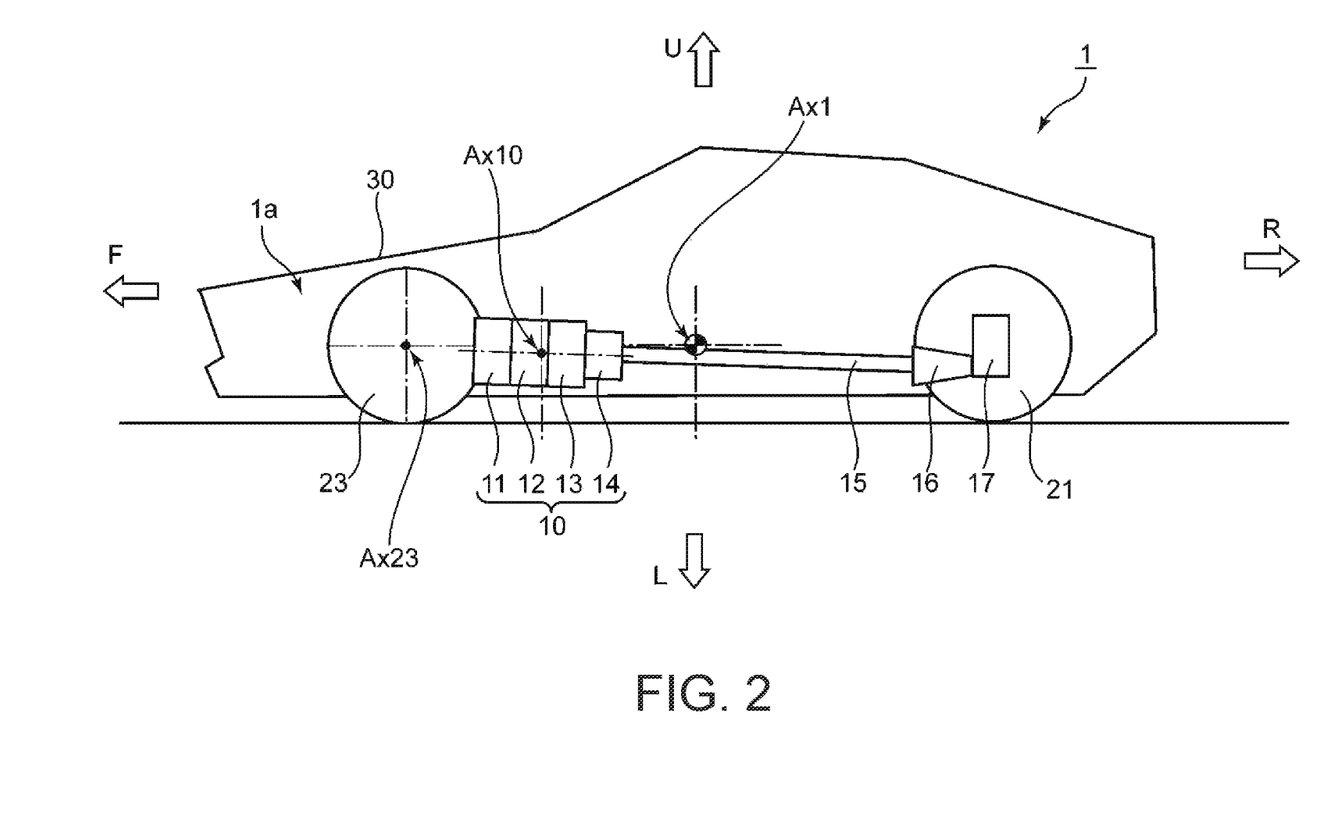
FIG. 2 is a schematic view illustrating a mounting position of a drive unit in the vehicle.

A description will be made on a mounting position of the drive unit 10 in the vehicle 1 with reference to FIG. 2.

As described above, in the vehicle 1, the drive unit 10 is mounted in the rear portion of the front area 1a. More specifically, the drive unit 10 is mounted such that a center of gravity Ax10 of the drive unit 10 is located behind a rotation center Ax23 of the front wheels 22, 23 (only the front wheel 23 is illustrated in FIG. 2). In addition, the drive unit 10 is mounted such that the center of gravity Ax10 thereof is located below the rotation center Ax23 of the front wheels 22, 23.

That is, in the vehicle 1, the drive unit 10 as a heavy object is made to be compact, and the drive unit 10 is thereby mounted in the rear portion of the front area 1a and in a lower portion having a clearance from a hood 30. In this way, a position Ax1 of center of gravity of the vehicle 1 can be set to a low position substantially at the center in a longitudinal direction of the vehicle 1.

3. Configurations of Drive Unit 10 and Peripheries

A description will be made on a detailed configuration of the drive unit 10 and configurations of peripheries thereof with reference to FIG. 3 to FIG. 6.

Figure 3:
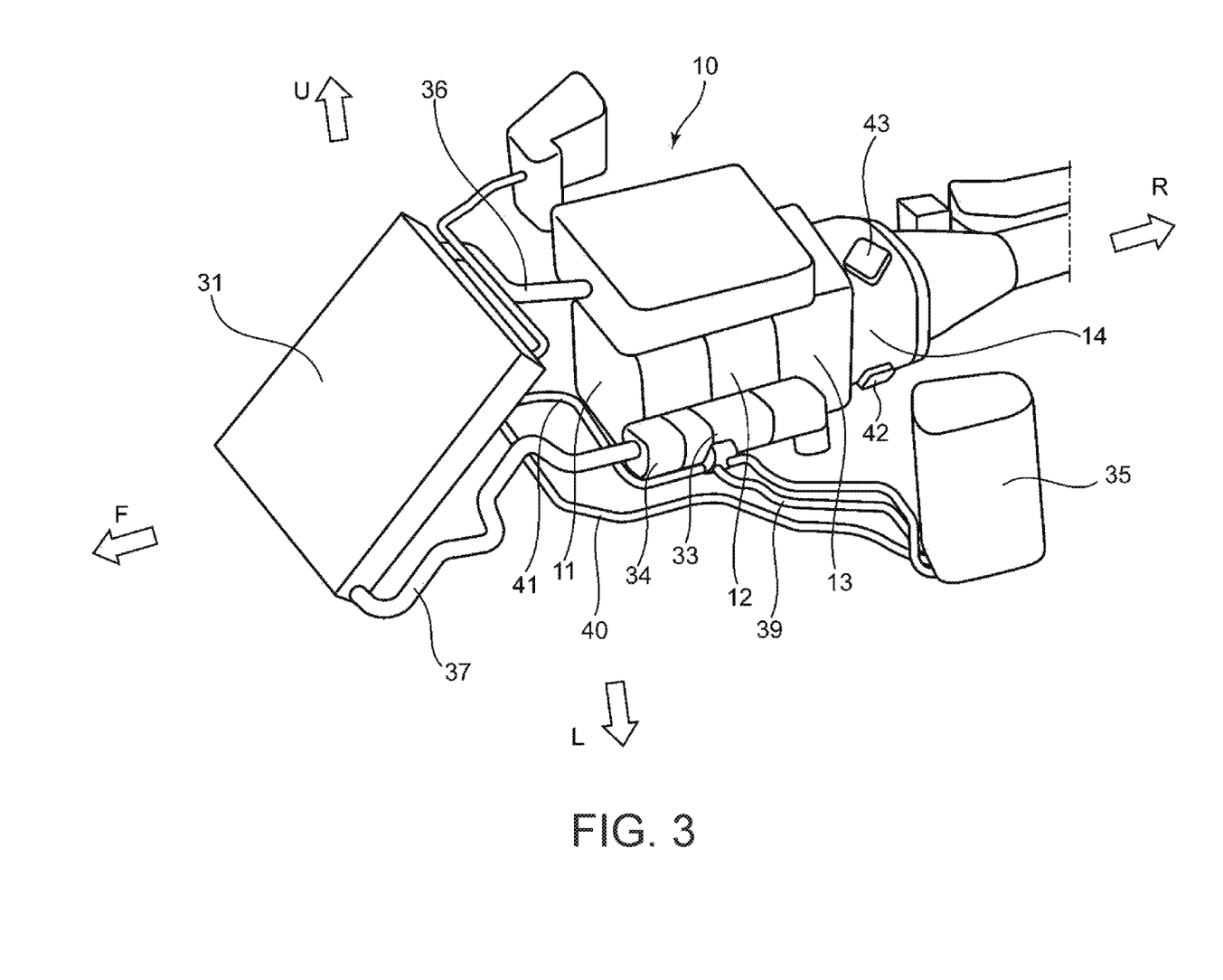
FIG. 3 is a perspective view illustrating a configuration of the drive unit.
Figure 4:
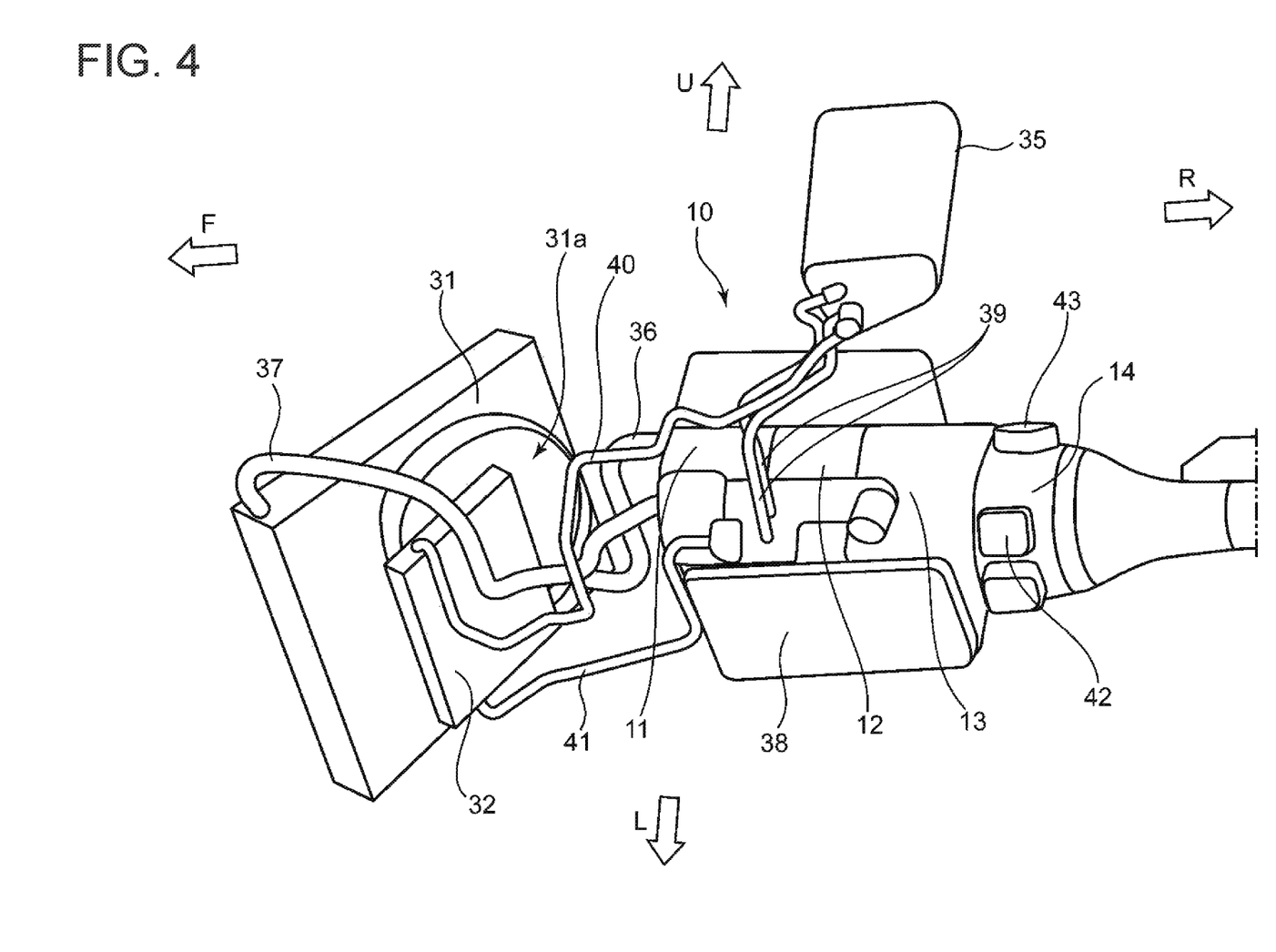
FIG. 4 is a perspective view illustrating the configuration of the drive unit.

As illustrated in FIG. 3 and FIG. 4, each of the engines 11 to 13 provided in the drive unit 10 is a rotary engine having a rotary piston as an example. The adoption of the rotary engines as the engines 11 to 13 in the vehicle 1 is beneficial for downsizing of the drive unit 10.

As illustrated in FIG. 4, an oil pan 38 is disposed below the engines 11 to 13. The oil pan 38 has a flat shape in which a dimension in a height direction is small in comparison with dimensions in the vehicle longitudinal direction and the vehicle width direction. This is beneficial to suppress a height of the drive unit 10 to be low.

As described above, in the vehicle 1 according to this embodiment, the oil pan 38 has the flat shape, and thus an accommodation volume of engine oil therein is low. For this reason, the oil pan 38 has a primary purpose of collecting the engine oil that has been distributed to the engines 11 to 13. Thus, an oil tank 35 is provided on a side of the drive unit 10 to store the engine oil collected in the oil pan 38.

Figure 5:
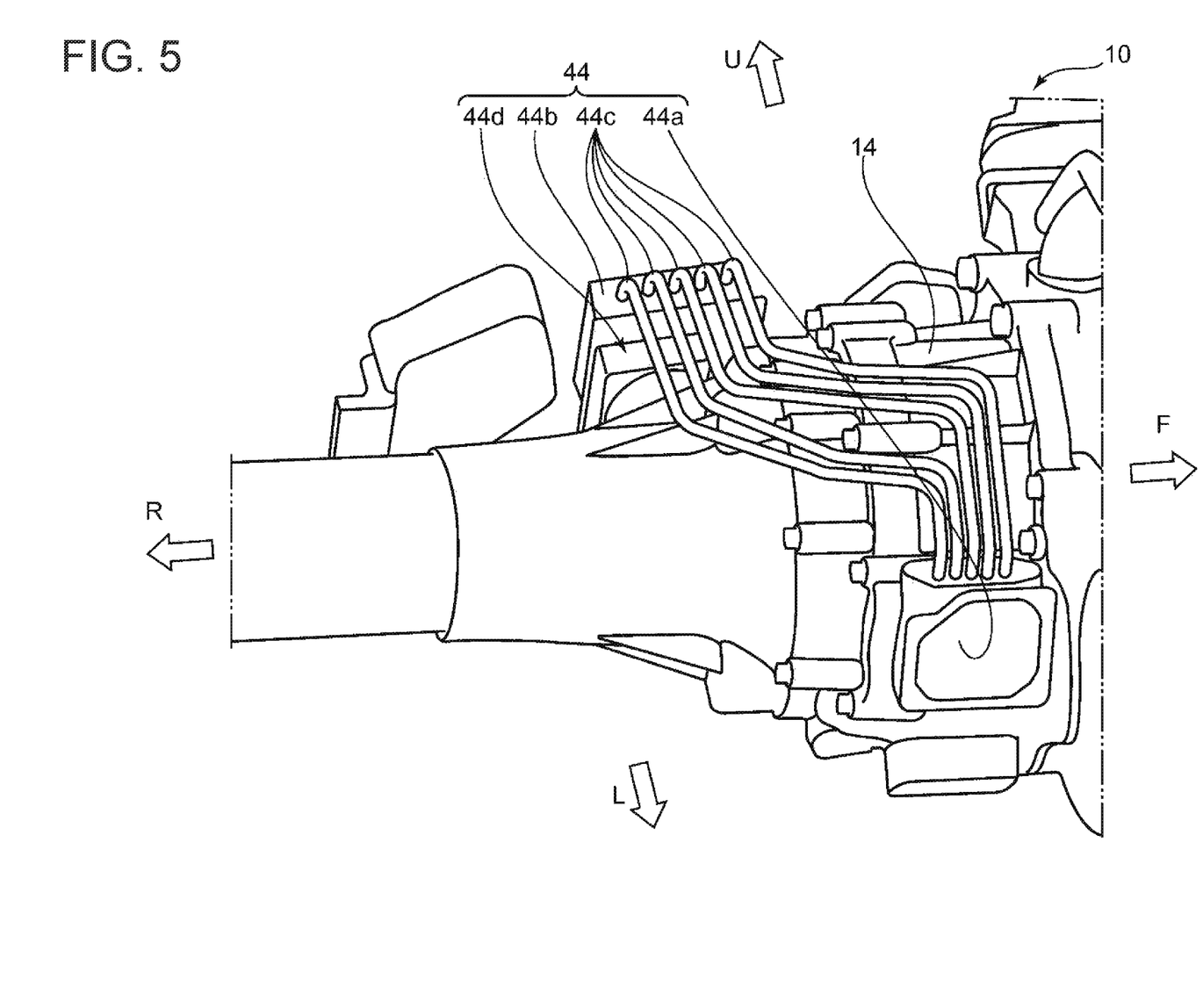
FIG. 5 is a perspective view illustrating arrangement of an ebullient cooler in the drive unit.

As illustrated in FIG. 3 and FIG. 4, the motor 14 provided in the drive unit 10 is arranged adjacent to a rear side of the engine 13. The engines 11 to 13 and the motor 14 have a direct-coupling structure to share an output shaft. Two heat exchangers 42, 43 are attached to an outer circumferential surface of the motor 14. In addition, as illustrated in FIG. 5, an ebullient section 44a of an ebullient cooler 44 is attached to the outer circumferential surface of the motor 14.

As will be described in detail later, the heat exchanger 42 is an example of a "first heat exchanger" in the present disclosure, and the heat exchanger 43 is an example of a "second heat exchanger" in the present disclosure.

The ebullient cooler 44 has, in addition to the ebullient section 44a, a condensation section 44b, pipes 44c, and an ebullient cooler fan 44d. The condensation section 44b is disposed behind the motor 14, and the ebullient cooler fan 44d is arranged adjacent to the condensation section 44b. Each of the pipes 44c couples the ebullient section 44a and the condensation section 44b. The pipes 44c are filled with an ebullient cooling refrigerant.

As illustrated in FIG. 3 and FIG. 4, a radiator 31 and an oil cooler 32 are disposed in front of the drive unit 10. The radiator 31 is a device for cooling a coolant, a temperature of which has become high by the heat from the engines 11 to 13, and has a radiator fan 31a on a rear side thereof. The radiator fan 31a is an example of a "fan in a second engine cooling path" in the present disclosure.

The oil cooler 32 is arranged behind the radiator 31 and is disposed along the radiator 31. The oil cooler 32 is smaller in plane size than the radiator 31.

Pipes 36, 37 connect each of the engines 11 to 13 and the radiator 31. A water pump 34 is provided to a connection portion between the pipe 37 and each of the engines 11 to 13.

Each two of the oil cooler 32, the engines 11 to 13, the oil tank 35, and the oil pan 38 are connected by respective one of pipes 39 to 41 and the like. An oil pump 33 is provided to a connection portion between the pipe 41 and each of the engines 11 to 13.

Figure 6:
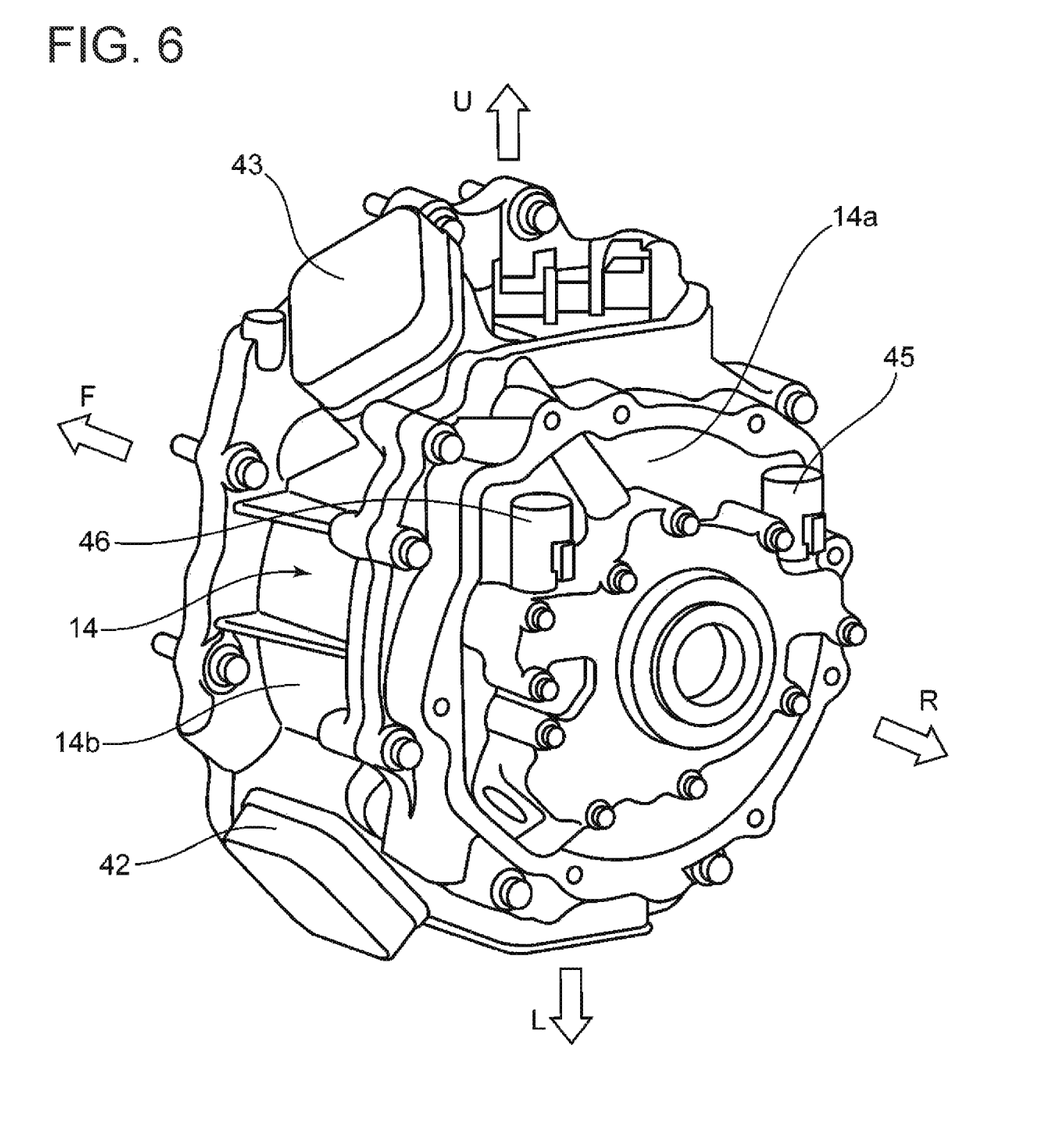
FIG. 6 is a perspective view illustrating arrangement of an oil control valve.

As illustrated in FIG. 6, two oil control valves 45, 46 are disposed in a rear housing 14a of the motor 14. The oil control valve 45 and the oil control valve 46 are disposed in a state of being distributed to right and left sides in a portion above a center portion of the rear housing 14a. As will be described in detail later, the oil control valve 45 is an example of a "first oil control valve" in the present disclosure, and the oil control valve 46 is an example of a "second oil control valve" in the present disclosure.

4. Coolant Circulation Path for Engines 11 to 13

A description will be made on a coolant circulation path for the engines 11 to 13 of the drive unit 10 with reference to FIG. 7A.

Figure 7A:
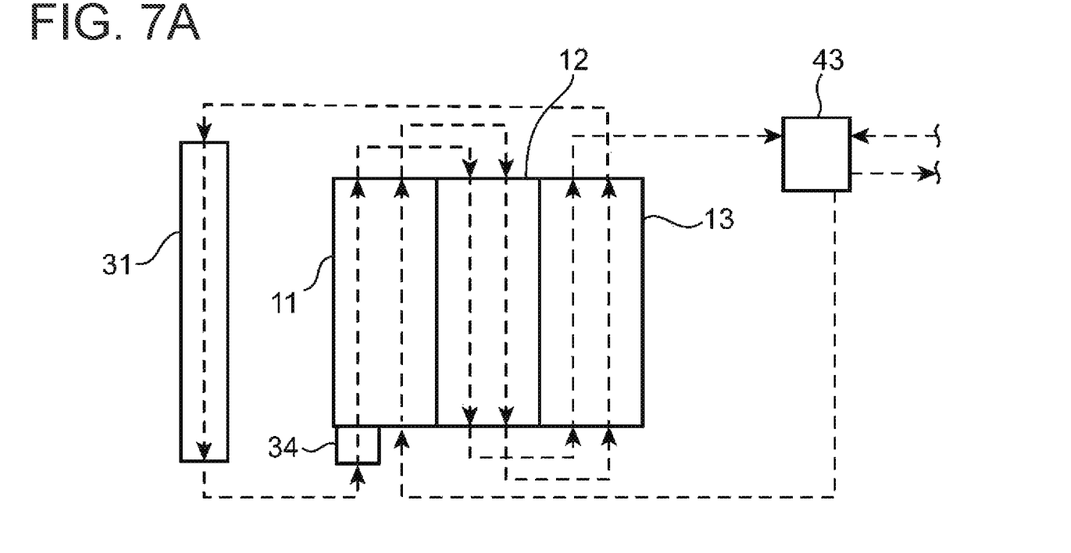
FIG. 7A is a schematic view illustrating a coolant circulation path for engines.

As illustrated in FIG. 7A, the coolant circulation path for the engines 11 to 13 is formed to circulate through the radiator 31, each of the engines 11 to 13, and the heat exchanger 43. More specifically, the coolant that has been cooled by the radiator 31 is introduced from the water pump 34 into a high-pressure water jacket in the front engine 11. Thereafter, the coolant flows from a high-pressure water jacket in the engine 12 through a high-pressure water jacket in the engine 13 and is then introduced into the heat exchanger 43.

The coolant that has flowed through the heat exchanger 43 circulates through a low-pressure water jacket in the engine 11, a low-pressure water jacket in the engine 12, and a low-pressure water jacket in the engine 13 in this order and returns to the radiator 31.

Although will be described below, the heat exchanger 43 is configured to be able to exchange heat with oil for cooling the motor 14.

5. Engine Oil Circulation Path for Engines 11 to 13

A description will be made on an engine oil circulation path for the engines 11 to 13 of the drive unit 10 with reference to FIG. 7B.

Figure 7B:
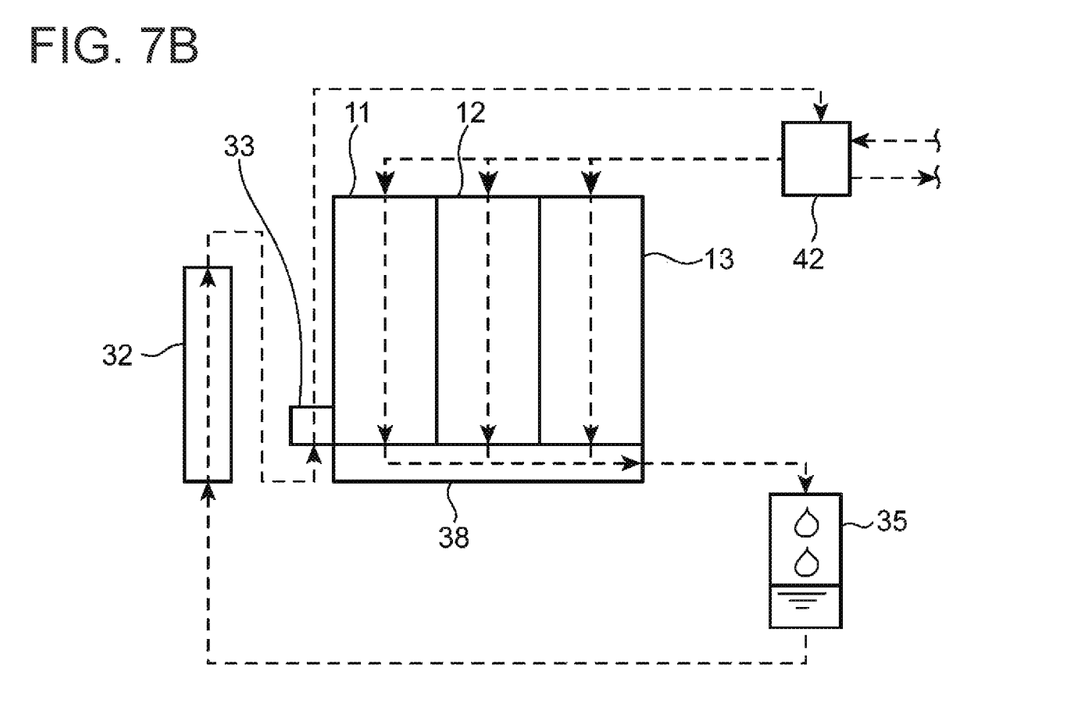
FIG. 7B is a schematic view illustrating an engine oil circulation path for the engines.

As illustrated in FIG. 7B, the engine oil circulation path for the engines 11 to 13 is formed to circulate through the oil cooler 32, the heat exchanger 42, the engines 11 to 13, and the oil tank 35. More specifically, the engine oil that has been cooled by the oil cooler 32 flows from the oil pump 33 through the heat exchanger 42 and is introduced into the engines 11 to 13. The engine oil that has flowed through each of the engines 11 to 13 is collected in the oil pan 38 and is delivered to the oil tank 35.

The engine oil that has been delivered to the oil tank 35 is temporarily stored in the oil tank 35 and is thereafter delivered to the oil cooler 32.

Although will be described below, the heat exchanger 42 is also configured to be able to exchange heat with the oil for cooling the motor 14.

6. Cooling Configuration of Motor 14

A description will be made on a cooling configuration of the motor 14 in the drive unit 10 with reference to FIG. 8.

Figure 8:
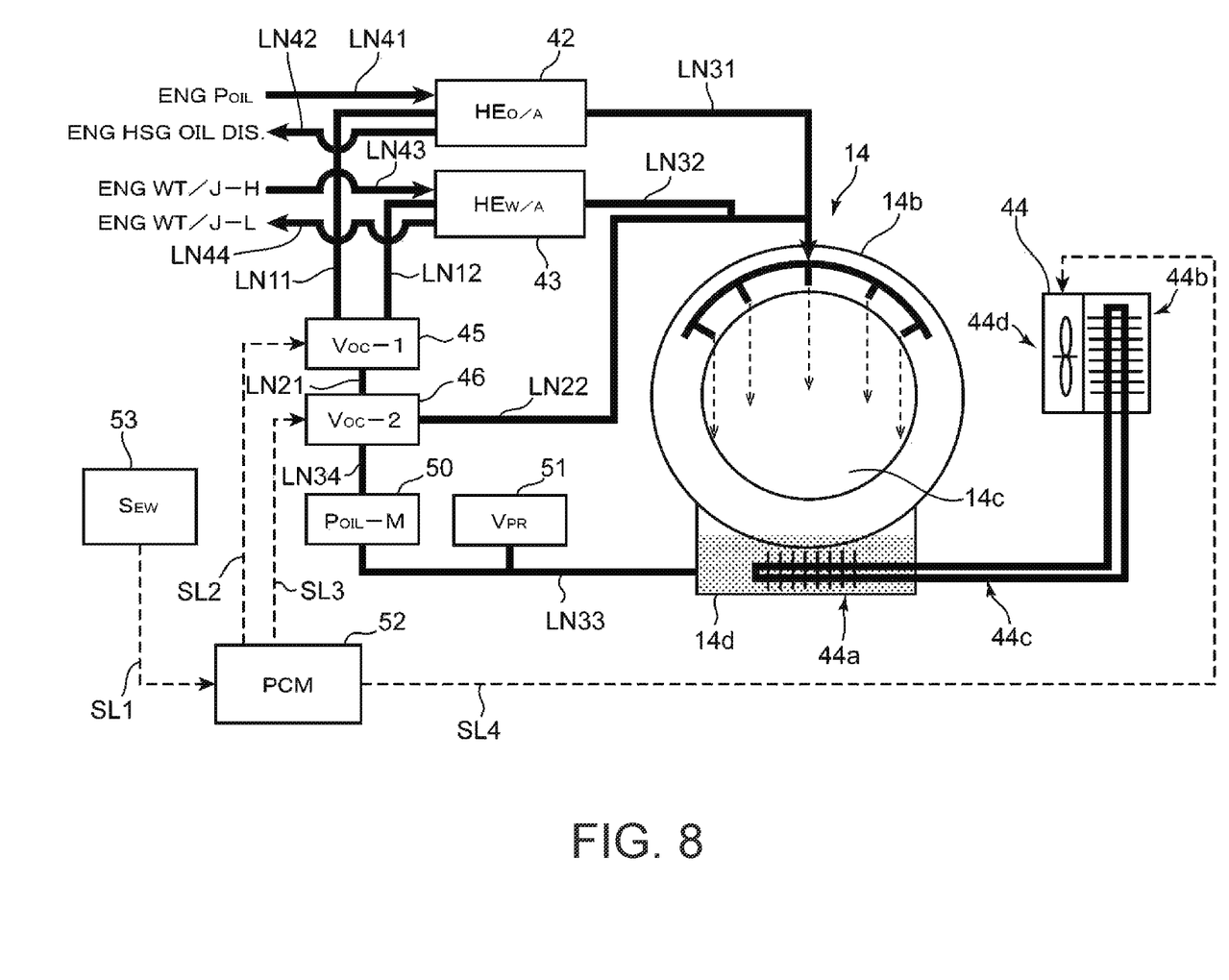
FIG. 8 is a schematic view illustrating a configuration related to cooling of a motor.

As illustrated in FIG. 8, the motor 14 includes housings 14a, 14b (only a lateral housing 14b is illustrated in FIG. 8), a rotor-stator 14c, and an oil pan 14d. Motor cooling oil paths LN22, LN31, LN32 are connected to upper portions of the housings 14a, 14b. The motor cooling oil path LN31 is an example of a "first motor cooling path" in the present disclosure, the motor cooling oil path LN32 is an example of a "second motor cooling path" in the present disclosure, and the motor cooling oil path LN22 is an example of a "third motor cooling path" in the present disclosure.

In the motor-drive mode (during travel of the vehicle in the motor-drive mode), the motor cooling oil flows through any of the motor cooling oil paths LN22, LN31, LN32 to cool the rotor-stator 14c and then flows into the oil pan 14d.

The oil that has been received by the oil pan 14d is delivered to an oil pump 50 for the motor 14 through a motor cooling oil path LN33. A pressure-relief valve 51 is also connected to the motor cooling oil path LN33.

The oil is delivered from the oil pump 50 to the oil control valve 46 through a motor cooling oil path LN34. As described above, the oil control valve 46 is an example of the "second oil control valve" in the present disclosure and is a valve that switches an oil delivery path to one of a motor cooling oil path LN21 and the motor cooling oil path LN22.

The motor cooling oil path LN21 is connected to the oil control valve 45. As described above, the oil control valve 45 is an example of the "first oil control valve" in the present disclosure and is a valve that switches the oil delivery path to one of a motor cooling oil path LN11 and a motor cooling oil path LN12.

The motor cooling oil path LN11 is an example of the "first motor cooling path" in the present disclosure, and the motor cooling oil path LN12 is an example of the "second motor cooling path" in the present disclosure. The motor cooling oil path LN11 is connected to the motor cooling oil path LN31 via the heat exchanger 42. The motor cooling oil path LN12 is connected to the motor cooling oil path LN32 via the heat exchanger 43.

In the engine oil circulation path, the engine oil that is pumped out of the oil pump 33 flows from an engine cooling oil path LN41 into an engine cooling oil path LN42 via the heat exchanger 42. The engine oil that has flowed into the engine cooling oil path LN42 through the heat exchanger 42 is delivered to an eccentric shaft. Then, the engine oil lubricates and cools a rotor.

In addition, a portion of the engine oil that has been delivered to the engine cooling oil path LN42 is injected into a combustion chamber of each of the engines 11 to 13 to lubricate and cool the housing, an apex seal, and a side seal.

In the heat exchanger 42, the motor cooling oil and the engine oil can exchange heat. That is, in the motor-drive mode, a temperature of the engine oil can be increased by the heat generated in the motor 14. Thus, in the vehicle 1, in the motor-drive mode, the engines 11 to 13, in each of which fuel is not supplied to the combustion chamber, can be warmed. As a result, it is possible to improve engine efficiency at the time when the drive mode is switched to the engine-drive mode.

In this embodiment, each of the engine cooling oil path LN41 and the engine cooling oil path LN42 are examples of a "first engine cooling path" in the present disclosure.

In the coolant circulation path for the engines 11 to 13, the coolant that has flowed out of the high-pressure water jacket in each of the engines 11 to 13 flows from an engine coolant path LN43 to an engine coolant path LN44 via the heat exchanger 43. The coolant that has flowed into the engine coolant path LN44 through the heat exchanger 43 is introduced into the low-pressure water jacket in each of the engines 11 to 13.

In the heat exchanger 43, the motor cooling oil and the coolant, which flows through each of the water jackets in the engines 11 to 13, can exchange heat. Also, in this way, in the motor-drive mode, the engines 11 to 13 can be warmed by the heat generated in the motor 14. As a result, it is possible to improve engine efficiency at the time when the drive mode is switched to the engine-drive mode.

The ebullient section 44a of the ebullient cooler 44 is disposed in the oil pan 14d of the motor 14. Here, as it has been described with reference to FIG. 5, an outer housing of the ebullient section 44a is attached to the outer circumferential portion of the motor 14 and can exchange heat with the oil in the oil pan 14d. As the ebullient cooling refrigerant in the ebullient cooler 44, a refrigerant, a boiling point of which is lower than that of the oil for cooling the motor 14, is used.

The vehicle 1 also includes a valve control unit 52 and an engine coolant temperature sensor 53. The engine coolant temperature sensor 53 is, for example, provided to a pipe 36 between the engine 13 and the radiator 31. The valve control unit 52 is an example of a "controller" in the present disclosure and is configured to include a microcomputer having a processor (i.e., a central processing unit (CPU)), memory (i.e., ROM and/or RAM), and the like. The valve control unit 52 is connected to the engine coolant temperature sensor 53 by a signal line SL1, is connected to the oil control valves 45, 46 by signal lines SL2, SL3, respectively, and is connected to the ebullient cooler fan 44d of the ebullient cooler 44 by a signal line SL4. The valve control unit 52 executes the switching control of the oil control valves 45, 46 and drive control of the ebullient cooler fan 44d on the basis of information on an engine coolant temperature from the engine coolant temperature sensor 53.

7. Cooling Control Method for Motor 14 Executed by Valve Control Unit 52

A description will be made on a cooling control method for the motor 14 that is executed by the valve control unit 52 with reference to FIG. 9 to FIG. 11.

Figure 9:
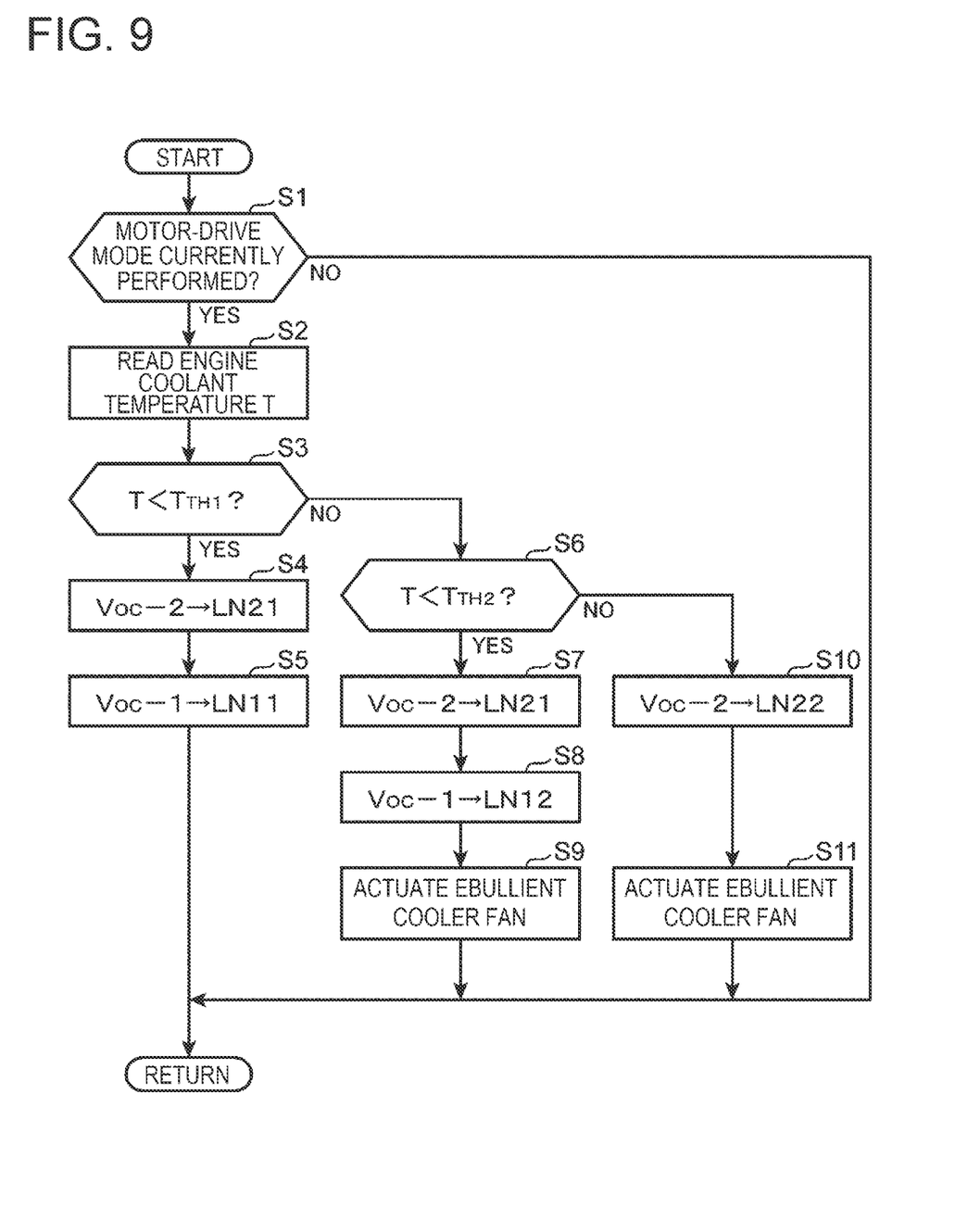
FIG. 9 is a flowchart illustrating a motor cooling control method executed by a valve control unit.

As illustrated in FIG. 9, the valve control unit 52 determines whether the vehicle 1 currently performs the motor-drive mode (step S1). When making a determination in step S1, the valve control unit 52 acquires information on the drive mode from the drive mode control unit 29. If the valve control unit 52 determines that the vehicle 1 currently performs the motor-drive mode (step S1: YES), the valve control unit 52 reads an engine coolant temperature T (step S2). The valve control unit 52 acquires the engine coolant temperature T from the engine coolant temperature sensor 53.

The valve control unit 52 determines whether the acquired engine coolant temperature T is lower than a preset first threshold $T_{TH1}$ (step S3). In this embodiment, as an example, the first threshold Tan is set to 40° C. If the valve control unit 52 determines that the engine coolant temperature T is lower than the first threshold $T_{TH1}$ (step S3: YES), the valve control unit 52 executes the switching control of the oil control valve 46 so as to connect the motor cooling oil path LN34 and the motor cooling oil path LN21 (step S4), and executes the switching control of the oil control valve 45 so as to connect the motor cooling oil path LN21 and the motor cooling oil path LN11 (step S5).

Figure 10A:
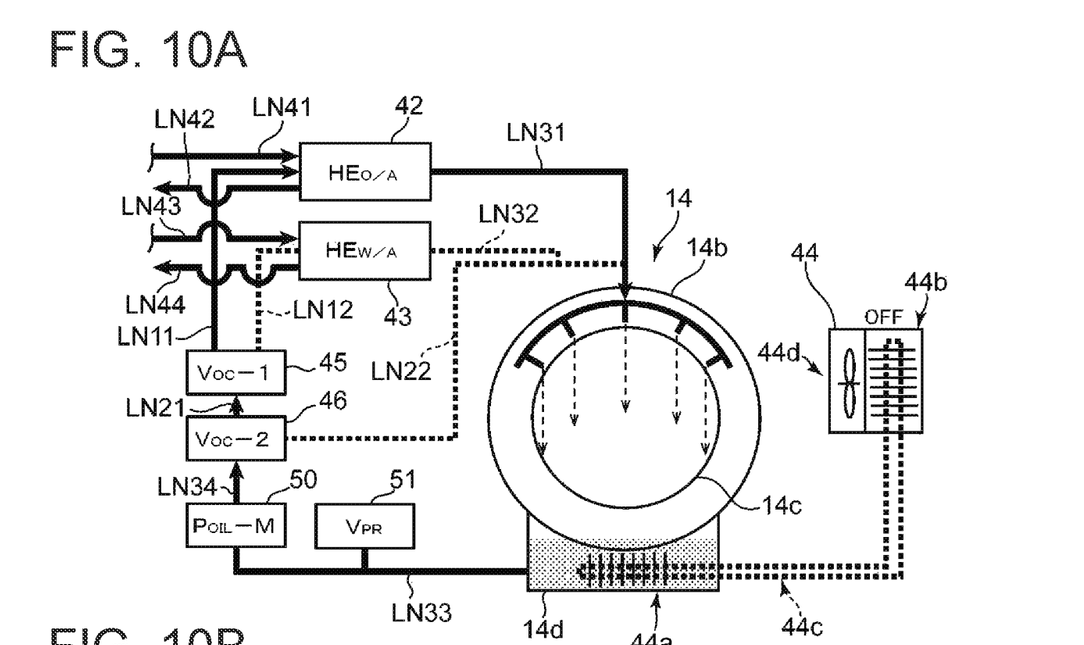
FIG. 10A is a schematic view illustrating a flow of oil when an engine coolant temperature is lower than a first threshold.

As illustrated in FIG. 10A, if the engine coolant temperature T is lower than the first threshold $T_{TH1}$ (step S3: YES), the motor cooling oil, which has been delivered from the oil pump 50, flows through the motor cooling oil paths LN34, LN21, LN11, LN31 and is introduced into the motor 14. Then, the oil exchanges heat with the engine oil in the heat exchanger 42. In this way, it is possible to increase the temperature of each of the engines 11 to 13, in which the fuel is not supplied to the combustion chamber. Thus, the engines 11 to 13 are warmed while a temperature of the motor 14 is maintained at an appropriate temperature.

Referring back to FIG. 9, if the valve control unit 52 determines that the engine coolant temperature T is equal to or higher than the first threshold $T_{TH1}$ (step S3: NO), the valve control unit 52 determines whether the engine coolant temperature T is lower than a preset second threshold $T_{TH2}$ (step S6). In this embodiment, as an example, the second threshold $T_{TH2}$ is set to 80° C.

If the valve control unit 52 determines that the engine coolant temperature T is equal to or higher than the first threshold $T_{TH1}$ and is lower than the second threshold $T_{TH2}$ (step S6: YES), the valve control unit 52 executes the switching control of the oil control valve 46 to connect the motor cooling oil path LN34 and the motor cooling oil path LN21 (step S7), and executes the switching control of the oil control valve 45 to connect the motor cooling oil path LN21 and the motor cooling oil path LN12 (step S8). The valve control unit 52 actuates the ebullient cooler fan 44d of the ebullient cooler 44 (Step S9).

Figure 10B:
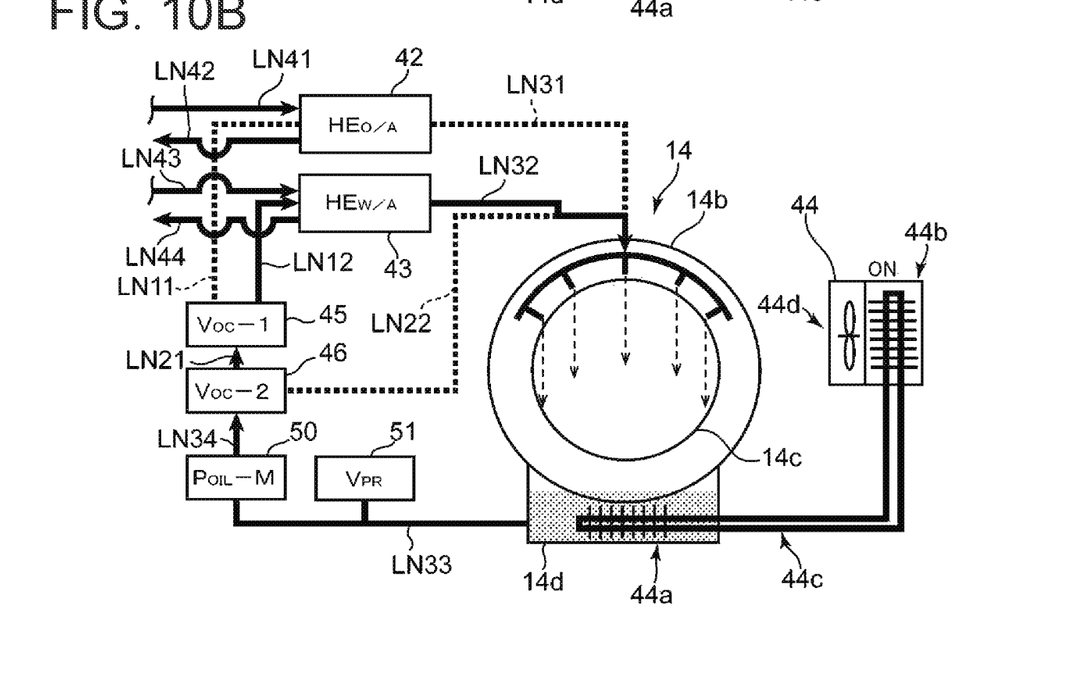
FIG. 10B is a schematic view illustrating the flow of the oil when the engine coolant temperature is equal to or higher than the first threshold and is lower than a second threshold.

As illustrated in FIG. 10(b), if the engine coolant temperature T is equal to or higher than the first threshold $T_{TH1}$ and is lower than the second threshold $T_{TH2}$ (step S6: YES), the motor cooling oil, which has been delivered from the oil pump 50, flows through the motor cooling oil paths LN34, LN21, LN12, LN32 and is introduced into the motor 14. Then, the oil exchanges the heat with the coolant for the engines 11 to 13 in the heat exchanger 43. Here, since the radiator 31 having the radiator fan 31a is provided in the coolant circulation path, the heat that has been transferred from the motor cooling oil to the coolant is cooled with higher efficiently.

Furthermore, if the engine coolant temperature T is equal to or higher than the first threshold $T_{TH1}$ and is lower than the second threshold $T_{TH2}$ (step S6: YES), the ebullient cooler fan 44d of the ebullient cooler 44 is also actuated. Thus, the motor 14 can further be cooled. Accordingly, even in the case where the temperature of the motor is increased due to continuous driving of the motor 14 or the like, it is possible to maintain the temperature of the motor 14 at the appropriate temperature by further efficient cooling and to suppress a reduction in a magnetic force of a magnet in the motor 14.

Referring back to FIG. 9 if the valve control unit 52 determines that the engine coolant temperature T is equal to or higher than the second threshold $T_{TH2}$ (step S6: NO), the valve control unit 52 executes the switching control of the oil control valve 46 so as to connect the motor cooling oil path LN34 and the motor cooling oil path LN22 (step S10), and actuates the ebullient cooler fan 44d of the ebullient cooler 44 (step S11).

Figure 11:
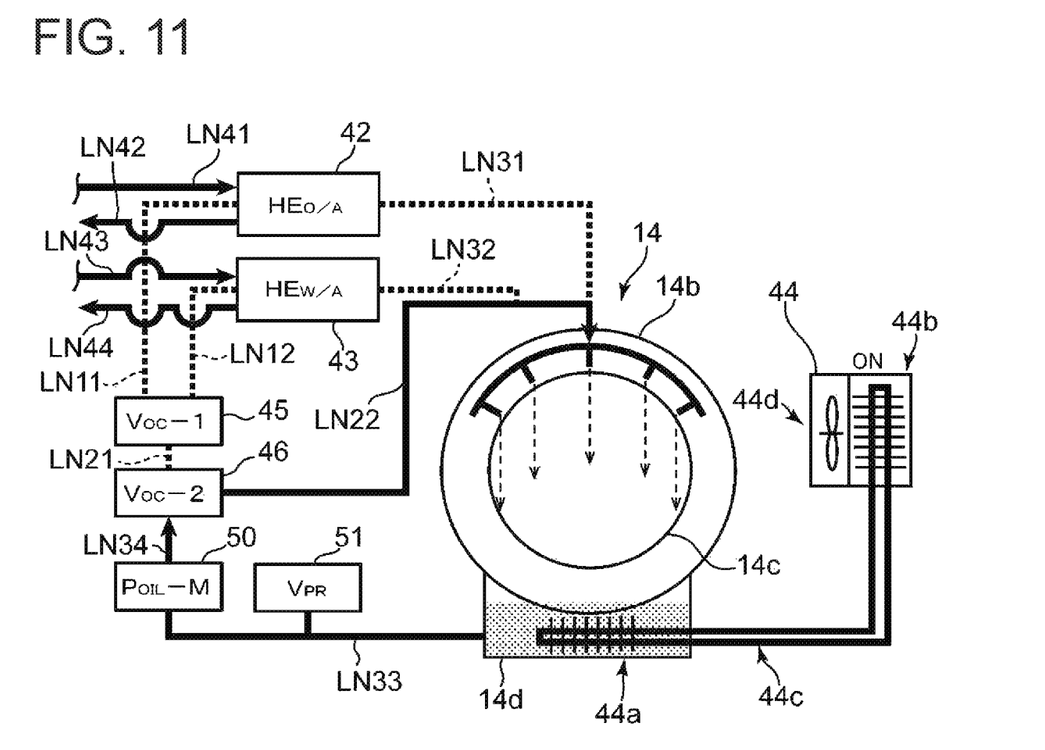
FIG. 11 is a schematic view illustrating the flow of the oil when the engine coolant temperature is equal to or higher than the second threshold.

As illustrated in FIG. 11, if the engine coolant temperature T is equal to or higher than the second threshold $T_{TH2}$ (step S6: NO), the motor cooling oil is prevented from flowing through the heat exchangers 42, 43. That is, the motor 14 is cooled by the ebullient cooler 44. This is because it is determined that, since the temperature of each of the engines 11 to 13 has already been increased to a specified temperature or higher, it is difficult to transfer the heat to the engines 11 to 13 via the heat exchangers 42, 43.

Modified Examples

In the vehicle 1 according to the above embodiment, the drive unit 10, which is configured to include the three engines 11 to 13 and the single motor 14, is adopted. However, the present invention is not limited thereto. For example, a drive unit configured to include a single engine and a single motor or a drive unit configured to include a plurality of engines and a plurality of motors can be adopted.

In the vehicle 1 according to the above embodiment, each of the engines 11 to 13 is the rotary engine. However, a reciprocating engine can be adopted for the present invention. Here, in the vehicle 1 according to the above embodiment, for which the rotary engine is adopted, the drive unit 10 can further made to be compact. This is beneficial to achieve higher vehicle motion performance.

In the vehicle 1 according to the above embodiment, the oil cooler 32 does not include a cooling fan. However, the present invention is not limited thereto. The oil cooler can include the cooling fan or can be added with a mechanism capable of spraying misty water onto a fin of the oil cooler.

In the above embodiment, an FR (front engine, rear-wheel drive) vehicle is adopted as an example of the vehicle 1. However, the present invention is not limited thereto. For example, an RR (rear engine, rear-wheel drive) vehicle, in which the drive unit is mounted in a rear portion and transmits the drive power to rear wheels, an MR (mid-engine, rear-wheel drive) vehicle, in which the drive unit is mounted to a position behind a driver's seat to transmit the drive power to rear wheels, or further an FF (front engine, front-wheel drive) vehicle, in which the drive unit is mounted to a rear portion of a front area to transmit the drive power to front wheels, can be adopted.

In the above embodiment, a spool valve is adopted as each of the oil control valves 45, 46. However, the present invention is not limited thereto. For example, a poppet valve or a slide valve can be adopted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 vehicle
10 drive unit
11 to 13 engine
14 motor
26 battery
29 drive mode control unit
31 radiator
31a radiator fan (fan)
32 oil cooler
42 heat exchanger (first heat exchanger)
43 heat exchanger (second heat exchanger)
44 ebullient cooler
45 oil control valve (first oil control valve)
46 oil control valve (second oil control valve)
52 valve control unit (controller)
53 engine coolant temperature sensor
LN11, LN31 motor cooling oil path (first motor cooling path)
LN12, LN32 motor cooling oil path (second motor cooling path)
LN22 motor cooling oil path (third motor cooling path)
LN21, LN33, LN34 motor cooling oil path
LN41, LN42 engine cooling oil path (first engine cooling path)
LN43, LN44 engine coolant path (second engine cooling path)

The invention claimed is:
1. A vehicle comprising:
a drive unit that includes an engine and a motor arranged adjacent to each other and has, as drive modes, an engine-drive mode in which the vehicle travels by the engine and a motor-drive mode in which the vehicle travels by the motor;

a first engine cooling path being a path of a first engine refrigerant for cooling the engine;
a second engine cooling path being a path of a second engine refrigerant for cooling the engine, including a fan for cooling the second engine refrigerant in the path, and being a different path from the first engine cooling path;
a motor cooling path being a path of a motor refrigerant for cooling the motor and including a first motor cooling path and a second motor cooling path that are different paths from each other;
a first heat exchanger by which the first engine refrigerant flowing through the first engine cooling path and the motor refrigerant flowing through the first motor cooling path exchange heat;
a second heat exchanger by which the second engine refrigerant flowing through the second engine cooling path and the motor refrigerant flowing through the second motor cooling path exchange the heat;
a first oil control valve that switches between the first motor cooling path and the second motor cooling path;
an engine coolant temperature sensor for detecting a temperature of the engine; and
a controller that controls the first oil control valve on the basis of the temperature of the engine, wherein
in the motor-drive mode, the controller executes switching control of the first oil control valve such that, in the case where the temperature of the engine is lower than a specified a first threshold, the motor is cooled by the first motor cooling path, and in the case where the temperature of the engine is equal to or higher than the first threshold, the motor is cooled by the second motor cooling path.

2. The vehicle according to claim 1, further comprising:
an ebullient cooler including:
a path for circulating an ebullient cooling refrigerant, a boiling point of which is lower than that of the motor refrigerant;
an ebullient section that is disposed in the middle of the circulation path to exchange the heat between the motor refrigerant and the ebullient cooling refrigerant; and
a condensation section that condenses the ebullient cooling refrigerant, wherein
in the case where the temperature of the engine is equal to or higher than the first threshold, the ebullient cooling refrigerant is boiled in the ebullient section, the boiled ebullient cooling refrigerant is condensed in the condensation section, and the motor is thereby cooled.

3. The vehicle according to claim 2, wherein
the motor includes a pan for receiving the motor refrigerant in a lower portion thereof, and
the ebullient section of the ebullient cooler is disposed in the pan.

4. The vehicle according to claim 3, wherein
the ebullient cooler further includes an ebullient cooler fan that is disposed adjacent to the condensation section and cools the condensation section with air, and
in the case where the temperature of the engine is equal to or higher than the first threshold, the controller drives the ebullient cooler fan.

5. The vehicle according to claim 4, wherein
the motor cooling path further includes a third motor cooling path that is a path branched from an upstream side in a flow direction of the refrigerant from the first oil control valve and connected to the motor without the first heat exchanger and the second heat exchanger being interposed therebetween,
a second oil control valve is provided at a position where the third motor cooling path is branched, and switches between the path to the first oil control valve and the third motor cooling path, and
in the motor-drive mode, in the case where the temperature of the engine is equal to or higher than a second threshold that is higher than the first threshold, the controller controls the second oil control valve for cooling the motor by the third motor cooling path.

6. The vehicle according to claim 5, wherein
the motor includes:
a rotor-and-stator; and
a housing that covers an outer side of the rotor-and-stator, and
the motor refrigerant is oil and flows from an upper side to a lower side inside of the housing.

7. The vehicle according to claim 6, wherein the first engine refrigerant is engine oil, and the second engine refrigerant is a coolant.

8. The vehicle according to claim 1, wherein
the motor cooling path further includes a third motor cooling path that is a path branched from an upstream side in a flow direction of the refrigerant from the first oil control valve and connected to the motor without the first heat exchanger and the second heat exchanger being interposed therebetween,
a second oil control valve is provided at a position where the third motor cooling path is branched, and switches between the path to the first oil control valve and the third motor cooling path, and
in the motor-drive mode, in the case where the temperature of the engine is equal to or higher than a second threshold that is higher than the first threshold, the controller controls the second oil control valve for cooling the motor by the third motor cooling path.

9. The vehicle according to claim 1, wherein
the motor includes:
a rotor-and-stator; and
a housing that covers an outer side of the rotor-and-stator, and
the motor refrigerant is oil and flows from an upper side to a lower side inside of the housing.

10. The vehicle according to claim 1, wherein the first engine refrigerant is engine oil, and the second engine refrigerant is a coolant.

11. The vehicle according to claim 2, wherein
the ebullient cooler further includes an ebullient cooler fan that is disposed adjacent to the condensation section and cools the condensation section with air, and
in the case where the temperature of the engine is equal to or higher than the first threshold, the controller drives the ebullient cooler fan.

12. The vehicle according to claim 2, wherein
the motor cooling path further includes a third motor cooling path that is a path branched from an upstream side in a flow direction of the refrigerant from the first oil control valve and connected to the motor without the first heat exchanger and the second heat exchanger being interposed therebetween,
a second oil control valve is provided at a position where the third motor cooling path is branched, and switches between the path to the first oil control valve and the third motor cooling path, and
in the motor-drive mode, in the case where the temperature of the engine is equal to or higher than a second threshold that is higher than the first threshold, the controller controls the second oil control valve for cooling the motor by the third motor cooling path.

13. The vehicle according to claim 2, wherein
the motor includes:
   a rotor-and-stator; and
   a housing that covers an outer side of the rotor-and-stator, and
the motor refrigerant is oil and flows from an upper side to a lower side inside of the housing.

14. The vehicle according to claim 2, wherein the first engine refrigerant is engine oil, and the second engine refrigerant is a coolant.

15. The vehicle according to claim 8, wherein
the motor includes:
   a rotor-and-stator; and
   a housing that covers an outer side of the rotor-and-stator, and
the motor refrigerant is oil and flows from an upper side to a lower side inside of the housing.

16. The vehicle according to claim 8, wherein the first engine refrigerant is engine oil, and the second engine refrigerant is a coolant.

17. The vehicle according to claim 9, wherein the first engine refrigerant is engine oil, and the second engine refrigerant is a coolant.

18. The vehicle according to claim 1, wherein the motor provided in the drive unit is arranged adjacent to a rear side of the engine, and the engine and the motor have a direct-coupling structure to share an output shaft.

19. The vehicle according to claim 2, wherein
the first heat exchanger and the second heat exchanger are attached to an outer circumferential surface of the motor, and
the ebullient section of the ebullient cooler is attached to the outer circumferential surface of the motor.

20. The vehicle according to claim 19, wherein
the ebullient cooler includes, in addition to the ebullient section, a condensation section, pipes, and an ebullient cooler fan,
the condensation section is disposed behind the motor,
the ebullient cooler fan is arranged adjacent to the condensation section,
each of the pipes couples the ebullient section and the condensation section, and
the pipes are filled with an ebullient cooling refrigerant.

* * * * *